Feb. 18, 1941.   P. ZALKIND   2,231,981
DISH INSULATION MEMBER
Filed April 20, 1936   4 Sheets-Sheet 1

INVENTOR.
BY Philip Zalkind
Samuel Ostrolenk
ATTORNEY.

Feb. 18, 1941.  P. ZALKIND  2,231,981
DISH INSULATION MEMBER
Filed April 20, 1936  4 Sheets-Sheet 2

INVENTOR.
Philip Zalkind
BY Samuel Ostrolenk
ATTORNEY.

Feb. 18, 1941.  P. ZALKIND  2,231,981

DISH INSULATION MEMBER

Filed April 20, 1936  4 Sheets-Sheet 3

INVENTOR.
Philip Zalkind
BY Samuel Ostrolenk
ATTORNEY.

Feb. 18, 1941.  P. ZALKIND  2,231,981
DISH INSULATION MEMBER
Filed April 20, 1936   4 Sheets-Sheet 4

INVENTOR.
Philip Zalkind
BY
Samuel Ostrolenk
ATTORNEY.

Patented Feb. 18, 1941

2,231,981

UNITED STATES PATENT OFFICE 2,231,981

DISH INSULATION MEMBER

Philip Zalkind, New York, N. Y.

Application April 20, 1936, Serial No. 75,313

10 Claims. (Cl. 229—14)

My invention relates to insulating containers, and more particularly to folding containers comprising a plurality of dish-like sections adapted to be nested in each other prior to erecting the container in set up position.

My container is adapted for use with material that must be maintained at a temperature appreciably different than that of its surroundings. Thus it may be used for packing ice-cream and it is particularly adapted for use with pint or quart bricks of ice-cream such as are well known in the trade. However, I do not limit my invention to this particular application, for though it is well adapted for this particular use, it may be used for many other purposes wherever it is desired to restrict the flow of heat into or out of the material within the container.

I prefer that my container be made of paperlike material, and it may be constructed of molded paper or wood pulp; or pressed dish-like sections using sheet material; or the disk-like sections may be formed by blanking out sheet material which may be cut and scored by the methods commonly in use in the manufacture of folding cartons, and folded, and/or glued to operative form.

With the dish-like portions, which may be constructed to nest one within another, I may use an auxiliary container, which with the dish-like sections forms air spaces which provide the insulation for the container. The container may be constructed of paper-like sheet material and may be folded or collapsed. Moreover, this auxiliary container may be formed independently of the dish sections, or it may be formed integrally with the dish sections. When the dish sections are used with brick ice-cream they may be so placed around the brick that the carton, in which brick ice-cream is usually dispensed, become the auxiliary container co-operating with the dish-like sections to form insulating air spaces.

In my construction I prefer that the dishes be joined to one another in order to facilitate their application. However, I make provision in my construction whereby the dish sections may be separated from each other. In this way after they have served their purpose as insulating means with the package they may then be used separately as dishes. This is a particularly desirable feature in connection with the retail dispensing of ice-cream.

My insulating container is simple and inexpensive. Moreover, prior to its application it takes up a relatively small space. It is easy and simple to apply. It provides a relatively high degree of insulation for the amount of material that it contains. It is therefore relatively light and easy to carry when it is in use. It may be used in a number of ways and has considerable versatility in its application.

Objects of my invention are thus: to provide a simple and inexpensive insulating container; to provide an insulating container that may be stored in a small space; to provide an insulating container having a relatively high degree of insulation for the amount of material which it contains; to provide an insulating container that is relatively light in weight; to provide an insulating container that is simple to set up for use to provide an insulating container that is versatile in its applications; to provide an insulating container, essential parts of which may be afterwards used as dishes. There are other objects of my invention which will be apparent from the following detailed description in connection with the drawings which form a part of these specifications, and in which.

In the following I will describe my novel container, by way of illustration, in its application in connection with package ice-cream which is dispensed at retail in cardboard cartons in which the ice-cream is wrapped at the factory.

Figure 1:
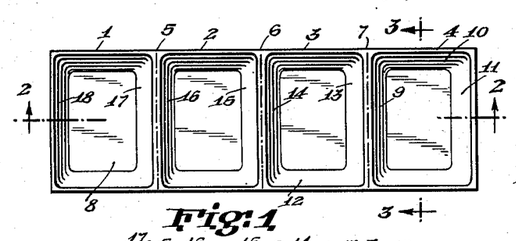
Figure 1 is a plan showing an expanded view of a group of dish-like sections suitable for forming my insulating casing.

Now referring to Figures 1 to 5 I show one grouping of dish-like structures, together with a suitable form of auxiliary container for use with this particular form. In Figure 1 are the four dishes 1, 2, 3 and 4 joined to each other at the score lines 5, 6 and 7. These score lines are preferably perforated lines which will facilitate the dishes being separated from each other when desired. As is more clearly seen in the cross-sectional views of Figures 2 and 3, each dish comprises a bottom panel from which extend sloping side walls, which for a rectangular casing are preferably all at an angle of 45° with the bottom panel. Thus as shown dish 4 consists of the bottom panel 8 and sloping side walls 9, 10, 11 and 12, all at an angle of 45° to the bottom panel 8. Each of the other three dishes are shaped in a similar manner. The edges of the sloping side walls on any of the dishes terminate substantially at the edge of that dish. However, between any two dishes where they are united with each other, I provide a sufficient flat portion for the score line and perforations as is shown at 5, 6 and 7. The dishes may be molded together in a single die using some form of papier mâché or paper felt, or it may be formed from a sheet of cardboard, straw board, or similar material cut out, creased and scored in a manner to be described more fully later. Where the casing is to be used, for instance, with brick ice-cream, the bottom panels of the dishes are of substantially the same dimensions as the sides of the carton in which the ice-cream is wrapped.

Figures 2, 4, 5, 6:
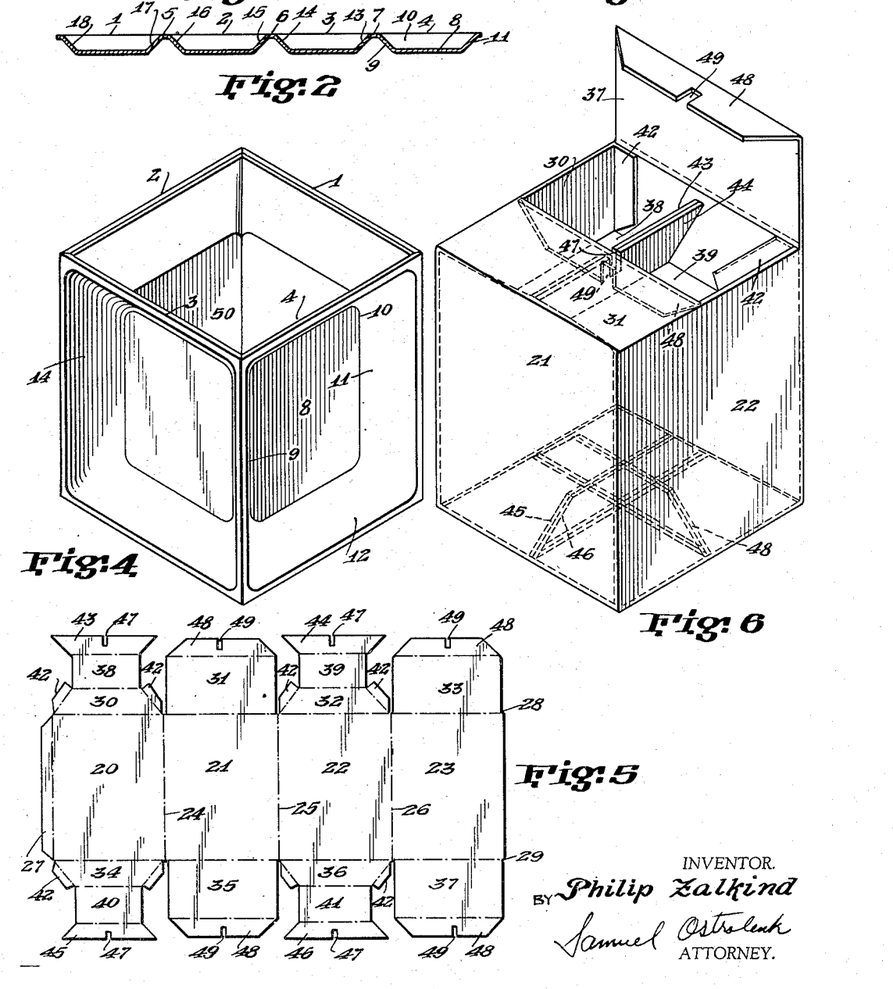
Figure 2 is a cross-sectional view on the line 2—2 of Figure 1.
Figure 4 is a perspective view showing the structure of Figure 1 folded to form a tube.
Figure 5 is a view of a developed blank for forming an auxiliary casing for use with the insulating structure shown in Figure 4.
Figure 6 is a perspective view showing the blank of Figure 5 folded into assembled condition.
Figure 3:
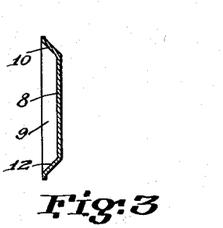
Figure 3 is a cross-sectional view on the line 3—3 of Figure 1.

Figure 5 shows a developed blank for an auxiliary casing to be used with the dishes shown in Figure 1. This blank consists of the four main panels 20, 21, 22 and 23 of substantially the same dimensions as the outside dimensions of dishes 1, 2, 3 and 4 respectively. Panel 20 is united with panel 21 at the score line 24; panel 21 is united with panel 22 at the score line 25; and panel 22 is united with the panel 23 at the score line 26. Panel 20 is provided with the side flap 27 by which panel 20 may be united with panel 23 when the blank is folded on score line 25, thus forming a collapsed tube. Panels 20, 21, 22 and 23 are united respectively with the flaps 30, 31, 32 and 33 at the score line 28, and with the flaps 34, 35, 36 and 37 at the score line 29.

Flaps 30, 32, 34 and 36 are of substantially the same length as the sloping sides (as sides 10 and 12) of the dishes shown in Figure 1. The sides of these flaps are cut on a diagonal line in such a manner, that when the flaps are folded at 45° the distance that the diagonals are cut back will be equal to the distance that the flaps extend in a perpendicular line. Each of these diagonal sides are provided with side tab 42. United with flaps 30, 32, 34 and 36 are the flap extensions 38, 39, 40 and 41 respectively. These flap extensions are made of such length that when the blank is folded into position the flap extensions will terminate at substantially the centre of the container. The flap extensions 38, 39, 40 and 41 are provided with end tabs 43, 44, 45 and 46 respectively. These tabs are of substantially the same length as the depth of the dishes, and each is provided with a central slot 47 extending a distance slightly greater than half of the length of the tab. Also the sides of each tab extends outwardly along a 45° angle.

Flaps 31, 33, 35 and 37 are rectangular in shape. The length of these flaps is substantially equal to one-half the width of panels 20 and 22. Thus when the casing is folded into position, these flaps will terminate at the centre of the casing. Each of the flaps 31, 33, 35 and 37 is provided with an end tab 48 of substantially the same length as the depth of the dishes 1 to 4 inclusive. Each of these tabs is cut back at its corners at an angle of 45°, and each is provided with a central slot 49, extending for a depth of slightly more than one-half of the length of the tab.

It can be seen that the dishes may be delivered to the user in the form of blanks as shown; and that these blanks may be nested one within the other so that a large number of the blanks will take up but little space. Also the auxiliary casing may be delivered as collapsed tubes, and therefore require very little room.

In setting up the package, the auxiliary casing is first expanded, and the bottom folded into place by bending the flaps on their respective score lines. Flaps 34 and 36 are first bent into place, which is inwardly at a 45° angle, tabs 42 being bent outwardly toward the open bottom and abutting against the side walls 21 and 23. Flap extensions 40 and 41 are then turned into a position in a plane at right angles to the side walls 20, 21, 22 and 23, the tabs 45 and 46 being turned at right angles to the flap extensions 40 and 41. In this position the tabs 45 and 46 will lie in face to face relationship with each other and their free edge will lie toward the bottom of the casing. Flaps 35 and 37 are then folded over to lie in a plane perpendicular to the side walls 20, 21, 22 and 23, and are thus parallel to the flap portions 40 and 41 which had previously been placed in position. Before folding the flaps 35 and 37, however, their tabs 48 are folded at right angles so as to point inwardly into the casing. Thus when the flaps 35 and 37 are folded into position, their tabs 48 come into face to face relationship with each other, and the slots 49 in the tabs 48 interlock with the slots 47 in the tabs 45 and 46. The bottom is thus securely held in place. Figure 6 is a perspective view of the auxiliary casing, with the bottom members shown in phantom and folded as just described. The method of this folding is clearly shown on the top of the casing which as shown is exactly similar to the bottom. This top is drawn in a manner to show the interior flaps and one of the exterior flaps in position, with the second exterior flap ready to be placed into position.

After the bottom of the auxiliary casing has been secured in position the main casing may be inserted. This is done by first rolling the blank of Figure 1 upon itself to form the casing of Figure 4. In this position diagonal side 17 lies in face to face relation with diagonal side 16; diagonal side 15 lies in face to face relation with diagonal side 14; similarly side 13 lies in face to face relation with side 9; and side 11 lies in face to face relation with side 18.

When the casing, as shown in Figure 4, is inserted in the auxiliary casing of Figure 6 (before closing the top end as shown in Figure 6), the inner web formed by flap extensions 40 and 41 will fit up within the interior space 50 formed by the folding of the dishes, and the bottom edge of the dishes will extend downward to meet the apex of the angle formed by each of the sides and its respective bottom flap. In this way five separate insulating air spaces are formed. Thus four of the spaces are formed by the four dishes co-operating with their four respective side walls, each dish lying with its edges against the side wall forming a separate air space. The fifth air space is formed by the four bottom diagonal sides of the four dishes co-operating with the interior flaps of the auxiliary casing forming one face and four sides, and the outer flaps of the auxiliary casing forming the other face of the fifth air space.

The top flaps of the auxiliary casing may now be placed into position, and these flaps, together with the sloping upper edges of the dishes, form a sixth air space, thus completing the insulation and providing an insulating air space on each side and on each end of the container. The top flaps are folded in as shown in Figure 6 and in the same manner as described for the bottom flaps. Thus flaps 30 and 32 with their auxiliary flaps and tabs 38, 39, 42, 43 and 44 are first folded into place forming an inner web, and then flaps 31 and 33 with their tabs 46 are folded into place, the slots 49 in the tabs of the outer flaps interlocking with the slots 47 in the tabs 43 and 44 of the inner flaps, thus locking the container into closed position.

A brick of ice-cream or other material may be placed in the space within the container prior to closing the top end of the auxiliary casing. Moreover, such material as dry ice may be used with the package, preferably being placed in the tray formed by the inner flaps and the end bevels of the dishes. It may be put in just before the outer flaps are closed. The ice-cream so packed will keep in good condition for a relatively long time. When it is desired that the ice-cream be used, the four dish-shaped sections which form the blank of Figure 1 may be separated from each other; and each of the four sections will form a separate dish, each suitable for serving an individual portion of the ice-cream.

Figures 7, 8, 9, 10, 11, 12:
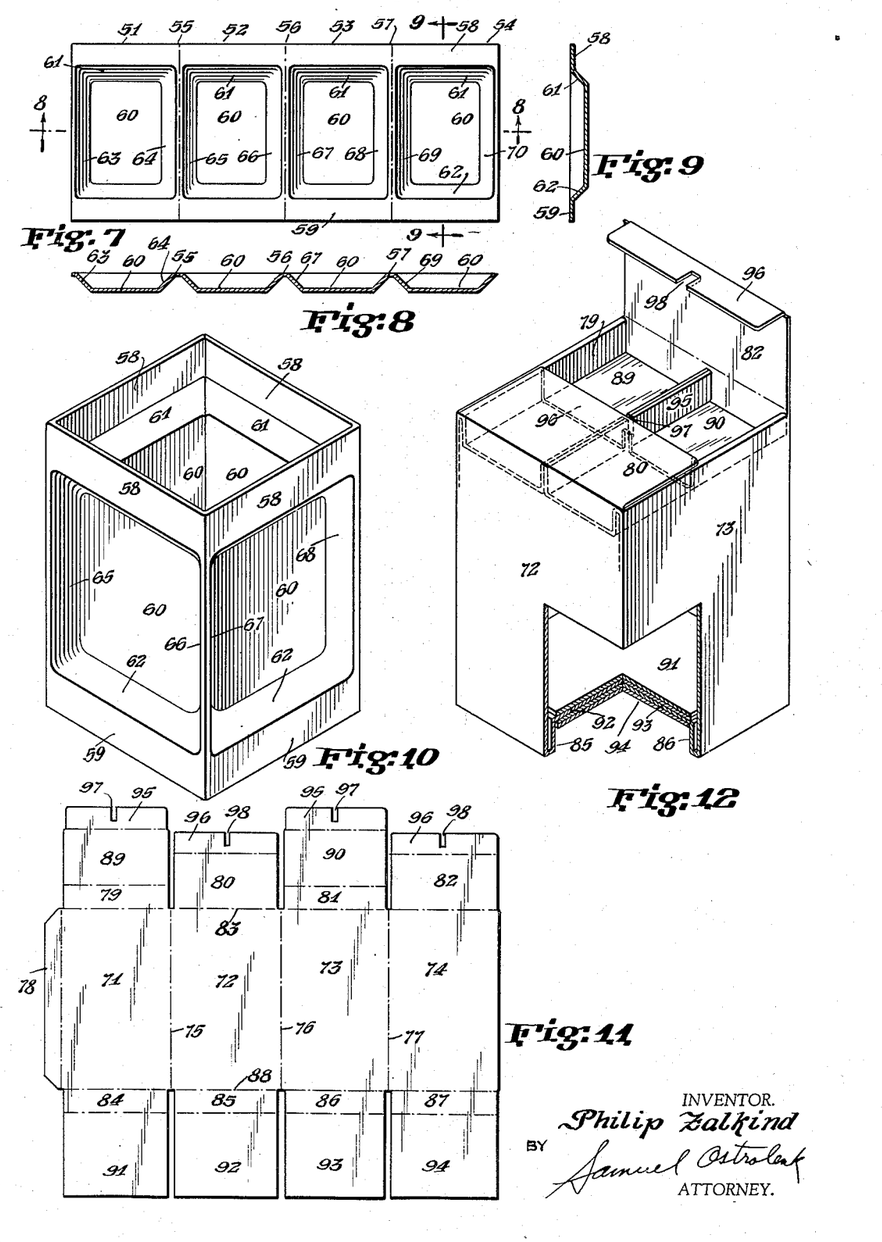
Figure 7 is a plan showing an expanded view of a group of modified dish-like sections for forming my insulating casing.
Figure 8 is a cross-sectional view on the line 8—8 of Figure 7.
Figure 9 is a cross-sectional view on the line 9—9 of Figure 7.
Figure 10 is a perspective view showing the structure of Figure 7 folded to form a tube.
Figure 11 is a view of a developed blank for forming an auxiliary casing for use with the insulating structure shown in Figure 10.
Figure 12 is a perspective view showing the manner in which the blank of Figure 11 folds into assembled position.

In Figures 7 to 12 inclusive, I have shown a modified form of dish section for producing the insulating casing, together with a modified form of auxiliary casing suitable for this modified form of dish section. In Figure 7 are four dishes, 51, 52, 53 and 54 joined to each other at the score lines 55, 56 and 57. These dishes are substantially the same as the dishes shown in Figure 1. However, where the dishes of Figure 1 terminate on their end edges at substantially the termination of end sloping sides, the dishes shown in Figure 7 are extended forming an extended lip 58 on the one end edge and a similar lip 59 on the other end edge as shown more clearly in Figure 9. As is seen from the cross-sectional views in Figures 8 and 9, each dish comprises a bottom panel 60, from which extend the sloping end panels 61 and 62, from which the extensions 58 and 59 respectively protrude as mentioned above. Dish 51 is provided with the sloping side panels 63 and 64; dish 52 is provided with the sloping side panels 65 and 66; dish 53 is provided with similar side panels 67 and 68; and dish 54 is provided with side panels 69 and 70. The edges of these side panels terminate substantially at the edge of their respective dish. However, between any two dishes where they are united with each other, I provide a sufficient flat portion for the score line and perforations as is shown at 55, 56 and 57. The dishes may be molded together in a single die or may be formed from a sheet by scoring and folding as has been explained in connection with Figures 1 to 4.

Figure 11 shows a developed blank for forming an auxiliary casing to be used with the dishes shown in Figure 7. This blank comprises four main panels 71, 72, 73 and 74 of substantially the same dimensions as the outside dimensions of dishes 51, 52, 53 and 54 respectively. Panel 71 is united with panel 72 at the score line 75; panel 72 is united with panel 73 at the score line 76; and panel 73 is united with panel 74 at the score line 77. Panel 71 is provided with the side flap 78 by which the panel 71 may be united with panel 74 when the blank is folded on the score line 76, thus forming a collapsed tube. Panels 71, 72, 73 and 74 are united respectively with the end flaps 79, 80, 81 and 82 at the score line 83; and with the flaps 84, 85, 86 and 87 at the score line 88 at the opposite end of the panels.

Flaps 79, 81 and 84 to 87 inclusive are of substantially the same length as the length of the extended faces 58 and 59 of the dish forms. Flaps 80 and 82 are in length substantially one-half of the width of panels 71 and 73, as are the extensions 89 and 90 of the flaps 79 and 81 respectively. Flaps 84, 85, 86 and 87 have, respectively, the flap extensions 91, 92, 93 and 94. Each of these flap extensions is of slightly less area than that of the open end of the tube formed when the panels 71 to 74 are folded at right angles to each other. Flaps 80 and 82 are provided with the end tabs 96. Both end tabs 95 and end tabs 96 are of a length substantially equal to the length of flaps 79 and 81, provision being made to care for the thickness of the material of the auxiliary casing. Tabs 95 are provided with the slots 97, and tabs 96 are provided with the slots 98. Both slots 97 and slots 98 extend into the tab for a distance slightly greater than one-half the length of the tabs as described above. The width of these slots is substantially twice the thickness of the material used.

In setting up the package the auxiliary casing is first expanded, and the bottom folded into place by bending the bottom flaps 84, 85, 86 and 87, and the bottom flap extensions 91, 92, 93 and 94 on their respective score lines. In this position flap 84 lies parallel to side panel 71; flap 85 lies parallel to side panel 72; flap 86 lies parallel to side panel 73; and flap 87 lies parallel to side panel 74. Flap extensions 91, 92, 93 and 94 all lie in face to face relationship with each other, and in a plane perpendicular to the side panels 71, 72, 73 and 74 in the manner shown in the cut away portion at the bottom of Figure 12, which shows a perspective view of the blank of Figure 11 in a partially assembled position.

It will be noted in the figure that each of the bottom flaps form a flange at the bottom of the auxiliary casing. Thus as shown flap 85 forms a flange at the bottom of the panel 72, and flap 86 forms a flange at the bottom of panel 73. These flanges are of substantially the same depth as the length of the extension 59 formed on the dish structures of Figure 7.

The blank of Figure 7 is now folded on its score lines 55, 56 and 57 in such a manner that sloping side 64 lies in face to face relationship with sloping side 65; side 66 lies in face to face relationship with side 67; side 68 lies in face to face relationship with side 69; and side 70 lies in face to face relationship with side 63. The form folded into such position is shown in perspective in Figure 10. In this position the form is inserted into the expanded casing formed from the blank of Figure 11 in the manner just explained. On fully inserting the folded dish structure into the expanded casing, the extended faces 59 will take a position between the flanges 84 to 87 inclusive and the respective side walls of these flanges. Each dish structure will lie in contact with one of the side walls along the entire open face of the dish. In this manner, each dish with its respective side wall forms a "dead air" insulating space. Thus the four side walls of the package are effectively insulated against the passage of heat. It will be noted in Figure 12 that the flap extensions 91 to 94 inclusive substantially cover the bottom end of the container between the flange extensions, and that these four extensions form a four ply laminated structure sealing the entire bottom. Where the auxiliary casing is made of cardboard of substantial thickness, or preferably where it is made of corrugated board, this four ply thickness supplies an appreciable insulating value for the bottom of the casing. The top of the casing is provided with insulation by the top flaps in the manner about to be described.

After the tube (as shown in Figure 10) has been placed within the auxiliary casing, and the material has been placed within the casing so formed, the top is ready to be closed. In order to accomplish this flaps 79 and 81, together with their flap extensions 89 and 90 respectively, and the tabs 95 are folded on their respective score lines in the manner shown in Figure 12. Thus flaps 79 and 81 lie parallel respectively to the side panels 71 and 73 forming flanges enclosing extensions 58 on two opposite dish-like structures. Panels 89 and 90 together form an inner closure, lying in a plane perpendicular to the extensions 58 where extensions 58 are united with sloping walls 61. In this position tabs 95 are in abutting relation to each other with their free edges pointing away from the centre of the casing. Dry ice or other suitable material may be inserted in the trays formed by the flaps, flap extensions and tabs so bent in the manner just described. The casing may now be closed by folding flaps 80 and 82 with their respective tabs 96 into position. Tabs 96 are bent into a plane at right angles to their respective flaps, the tabs being bent in a direction to point toward the centre of the casing when the flaps are folded into position. The flaps are then bent down, when the tabs will come into face to face relationship with each other; and slots 98 in tabs 96 will interlock with slots 97 in tabs 95, thus completing the package.

Now referring to Figures 13 to 20, I show a further modified arrangement of dish structure and several novel ways in which this dish structure may be utilized.

Figures 13, 14, 15, 16, 17, 18, 19, 20:
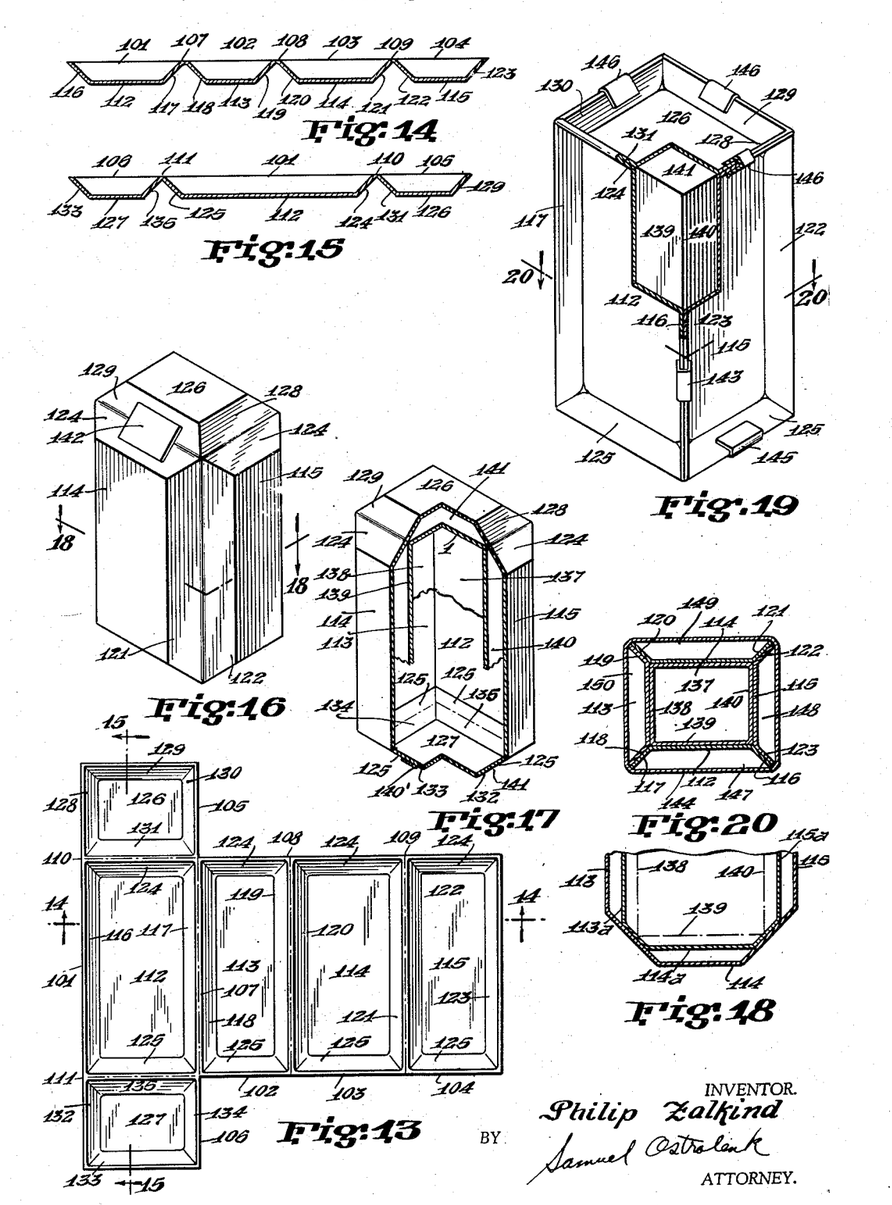
Figure 13 is a plan showing an expanded view of a modified group of dish-like sections for forming my insulating casing.
Figure 14 is a cross-sectional view on the line 14—14 of Figure 13.
Figure 15 is a cross-sectional view on the line 15—15 of Figure 13.
Figure 16 is a perspective view showing the structure of Figure 13 folded into a container with the convex side of the dishes turned outwardly.
Figure 17 is a perspective view showing the casing of Figure 16 partly broken away to reveal the manner in which a carton for brick ice-cream may serve as an auxiliary casing.
Figure 18 is a fragmentary cross-sectional view similar to that on the line 18—18 of Figure 16, showing how a double insulating air space may be formed when using two groups of dishes, the outer group having greater depth than the inner group.
Figure 19 is a perspective view showing the structure of Figure 13 folded into a container with the concave side of the dishes turned outwardly.
Figure 20 is a cross-sectional view along the line 20—20 of Figure 19 showing how the structure of Figure 19 may be inserted into an auxiliary casing which may be a suitable tight fitting bag, or a simple rectangular box.

In Figure 13 is shown a tray structure in which are combined in a modified arrangement, the particular form of individual tray which I have described in connection with Figure 1. In Figure 13 there is shown a group of six dishes 101, 102, 103, 104, 105 and 106 joined to each other at the score lines 107, 108, 109, 110 and 111. As with the previous forms, the form may be perforated along these score lines in order that the dishes may be separated from each other when desired. It will further be noted that the form of Figure 13 differs from the form shown in Figure 1 by the addition of the two end trays. Thus if trays 105 and 106 of Figure 13 were removed by tearing the form of Figure 13 on the perforated score lines 110 and 111, the form shown in Figure 1 would remain. Trays 105 and 106 are of the same construction as the other trays of the group, and are of such dimensions that they may be folded on the score lines 110 and 111, and will close the ends of the structure formed when the side trays 101, 102, 103 and 104 are folded on the score lines 107, 108 and 109.

Trays 101, 102, 103 and 104 consist respectively of the bottom members 112, 113, 114 and 115; the side slopes 116 and and 117, 118 and 119; 120 and 121, 122 and 123; and all have the two end slopes 124 and 125. Trays 105 and 106 consist respectively of the bottom members 126 and 127; and the side and end slope 128, 129, 130, 131 and 132, 133, 134 and 135. These slopes and bottoms are clearly shown in the cross-sectional views of Figures 14 and 15.

When this form of Figure 13 is folded on its score lines in such a manner that the concave portion of the dishes are on the inside of the casing, the form may be used without an auxiliary casing other than that provided by the carton enclosed by the casing. In this event the overall dimensions of each of the dishes of the form should substantially conform with the corresponding dimensions of the side of the carton with which it is associated. A package so formed is shown in perspective in Figure 16; and in Figure 17 the package of Figure 16 is cut away in a manner to show the interior carton, which is also shown as partly broken away.

The package so shown may be constructed by folding the dish structure on its score lines, with the convex side of the dishes facing outwardly. The edge of sloping side 123 of dish 104 is brought into abutting relation with the edge of the sloping side 116 of dish 101. The two are then united, preferably with remoistening pregummed paper tape or similarly. The lower dish 106 is then folded up so that the edge of slope 133 is in abutting relation to the edge of the sloping side 125 of the dish 103. This will bring the edge of sides 132 and 134 into abutting relationship with the sloping sides 125 of dishes 104 and 102 respectively. The bottom dish is then secured in this position, preferably with remoistening pregummed paper tape in the well-known manner, such as 140' shown in Figure 17.

The casing is now ready to receive the carton. Sides 137 and 139 of the carton are of the same dimensions as dishes 101 and 103; sides 138 and 140 of the carton are of the same dimensions as dishes 102 and 104; and the ends of the carton are of the same dimensions as dishes 105 and 106. The carton will thus fit closely within the casing and five separate "dead-air" spaces will be formed by the carton co-operating with the casing. Thus side 136 of the carton will fit closely around the open edge of dish 101 forming a separate air space. Similarly side 138 of the carton and dish 102 form a separate air space, as do side 139 and dish 103, side 140 and dish 104, and the bottom of the carton and dish 106. A separate insulating air space is formed over the top of the carton by folding down the dish 105, which makes contact along its open edge with the top of the carton and with the sloping sides 124 of dishes 101, 102, 103 and 104. The top dish 105 may be held in this position by means of a strip of pregummed tape 142 as shown in Figure 16. It will, of course, be understood that the entire joint where the free edge of one dish meets the free edge of an adjacent dish be similarly covered with tape; and I prefer that the joint be so sealed in order to increase the insulating value of the various air spaces.

It will further be understood that I may use two forms, one over the other to increase the value of the insulation. Except for changes in dimensions to allow for the thickness of the casing, the two forms will be of the same dimensions. However, I prefer that the outer dishes be appreciably deeper than the inner dishes. In this manner a double air space is formed on each side as is shown in Figure 18, which is a section along the plane 18—18 of Figure 16 when such a double wall construction is used.

When the form is made to fold in a manner that the concave portions of the dishes are outwardly, then the form must be of large size. Instead of the outline of the dishes being of the same dimension as the corresponding side of the carton, the bottom of the dish corresponds in size to the size of the carton side.

In assembling the casing the form of Figure 13 is folded on its score lines in such a manner that the concave portions of the dishes face outwardly. In this position sloping face 117 of dish 101 will be in face to face relationship with the sloping face 118 of dish 102. Similarly face 119 will lie in contact with face 120; face 121 will lie in contact with face 122; and face 123 will lie in contact with face 116. The face 116 may be united with the face 123 in any suitable manner, as, for instance, by adhesive material applied between the two portions, which adhesive material may be in the form of remoistening gum on one or the other of the two abutting panels. Another method of uniting the tube may be by the use of gummed tape on the outer surfaces of the two abutting panels, or the abutting panels may be secured to each other with suitable metallic clips which are adapted to be slid over the abutting sections as is shown by the clip 143 in Figure 19.

The bottom plate 106 may now be folded into position when the sloping sides 132, 133, 134 and 135 will come into face to face relationship with the sloping portions 125 of the casing walls. This bottom member may be secured in place in any suitable manner, as, for instance, with adhesive means as has been explained in connection with the uniting of the side walls; or one or more metallic clips 145 may be used for this purpose.

The casing is now ready to receive its contents, and as has been explained the volume within the casing has been proportioned to properly receive its contents, which, if it be a brick of ice-cream, fits snugly within the casing, the carton walls 137, 138, 139 and 140 of the brick fitting within the walls of the casing formed respectively by the panels 114, 113, 112 and 115. After the contents have been inserted into position, the top dish 105 is folded into place, and is secured in position in a manner as has been explained in connection with the closure of the bottom end by dish 106. Clips 146 may be used for this purpose or adhesive means may be used as has been explained. Where the dishes are to be used for service after removing the contents of the casing, I prefer that the clip means be used for uniting the sections, as the use of adhesive material will prevent the various sections from being disunited from each other for use as separate dishes.

After the casing has been assembled as described above, it may be inserted into a suitable auxiliary casing whereby suitable insulating air spaces are formed around the casing. In Figure 20 this auxiliary casing is shown by the rectangular structure 144, which, with the dishes 101, 102, 103 and 104 form the four air spaces 147, 148, 149 and 150 on the sides of the casing.

The auxiliary casing 144 may be of any suitable construction. Thus the auxiliary casing, such as is shown in Figure 6, as formed from the blank of Figure 5 may be used. I may also use a paper bag of a suitable size and having a bellows type bottom as a suitable auxiliary casing with the casing of Figure 19. Another form of auxiliary casing suitable for use with this form of casing may be obtained by simply wrapping the casing with paper in a suitable manner. Such wrapping may be of the same material as the casing and may be formed as an integral part of the primary casing, as is shown in Figures 21, 22 and 23, as will now be described.

Figures 21, 22, 23, 24:
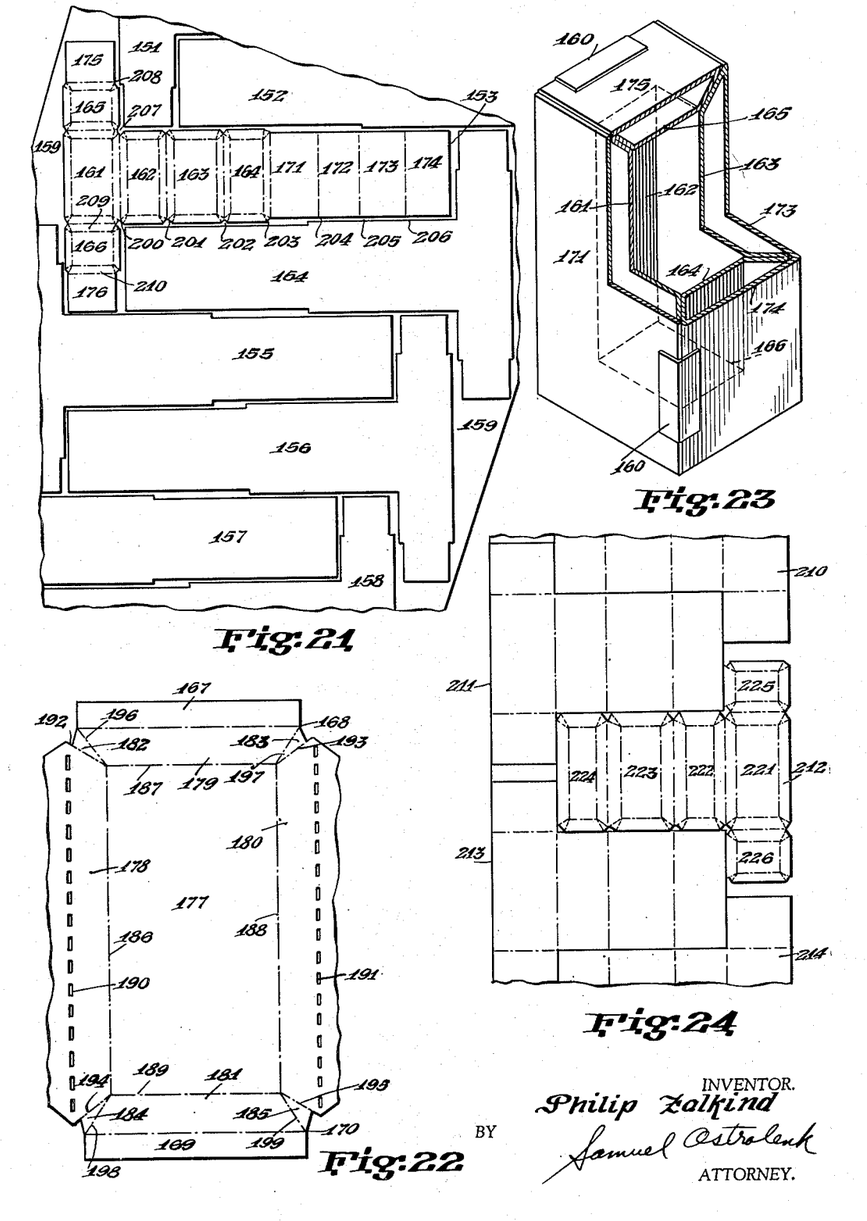
Figure 21 is a developed blank for integrally forming a group of dishes similar to those shown in Figure 19 together with its auxiliary blank from a sheet of fibrous material. In this figure is also shown the manner in which a plurality of these blanks may be secured from a suitable strip of sheet material with only a very moderate amount of waste material.
Figure 22 is an enlarged view showing the manner in which one of the dishes may be formed from sheet material.
Figure 23 is a developed view, partly broken away, showing a container formed from the blank of Figure 21.
Figure 24 is a developed blank showing the manner in which the group of dish-like structures shown in Figure 13 may be made as an integral unit from sheet material; and the manner in which a plurality of such blanks may be cut from a strip of such material without waste.

In Figure 21 I show a sheet of material laid out in a manner to show how the casing of Figure 19, provided with an integral auxiliary casing, may be cut with substantially no waste material. Thus 151, 152, 155, 157 and 158 each represent a portion of one such integral blank; and 153, 154 and 156 each represent an entire blank for such a container with an integral wrapper. The blank 153 shows the details of cutting and scoring which are omitted on the other blanks shown both for simplicity and clarity. Sufficient of each of the blanks are provided in the figure to clearly show how little of the sheet need be wasted in producing these blanks. Thus for each blank there is wasted merely a small triangular piece, such as is shown at 159.

Now referring in particular to the blank 153 which is shown in some detail as mentioned above, it will be noted that portion 161 corresponds to tray 101 of Figure 13; portion 162 corresponds to tray 102; portion 163 corresponds to tray 103; portion 164 corresponds to tray 104; portion 165 corresponds to tray 105; and portion 166 corresponds to tray 106. Portions 171, 172, 173, 174, 175 and 176, when folded in the manner to be described later, form the auxiliary casing. The various dishes may be formed from the flat sheet in a manner which will now be described; but it will be readily understood that the panels 171, 172, 173, 174, 175 and 176, forming the auxiliary casing, may readily be provided integrally with molded dishes when desired.

Now referring to Figure 22, I show the manner in which a suitable dish may be formed from flat sheet material. In this figure the panels 167 and 169 correspond to the portions 58 and 59 of the particular form of dish shown in Figure 7. However, by stopping the blank at the lines 168 and 170, the form of dish shown in Figures 1, 13 and 21 is secured.

In Figure 22, 177 represents the bottom of the dish which is united with the sloping wall panels 178, 179, 180 and 181 at the fold lines 186, 187, 188 and 189 respectively. United with the sloping end wall 179 at the score lines 196 and 197 are the tabs 182 and 183; and united with the sloping end wall 181 at the score lines 198 and 199 are the tabs 184 and 185. Tab 182 is separated from the side 178 by the cut line 192; tab 183 is separated from the side 180 by the cut line 193; tab 184 is separated from the side 178 by the cut line 194; and tab 185 is separated from the side 180 by the cut line 195. These cut lines are so made that when the sloping panels are bent up at a 45° angle to the bottom panel, the cut lines will be at 45° to the edges of the dish when viewed on a line perpendicular to the bottom panel 177. The score lines 196, 197, 198 and 199 are similarly formed. Thus when the panels 178, 179, 180 and 181 are folded at an angle of 45° to the bottom panel 177 along the respective score lines 186, 187, 188 and 189, the cut end edges of panels 178 and 180 lie coincident with the adjacent score lines 196, 197, 198 and 199 where tabs 182, 183, 184 and 185 join their respective panels. In this position tab 182 may be folded on line 196 to lie in face to face relationship to panel 178. By the application of adhesive to tab 182, panel 179 may thus be united with panel 178. In a similar manner panel 179 may be united with panel 180 by tab 183. Similarly panel 181 may be united with panels 178 and 180 by tabs 184 and 185 respectively. In this way, a dish is formed having sloping sides at a 45° angle to the bottom. Perforated score lines 190 and 191 show the manner in which a dish may be united at either side with a similarly formed dish. It will, of course, be understood that a dish could similarly be united at its ends, as, for instance, dish 161 is united to dishes 165 and 166 of Figure 21. Moreover, an end dish, such as 164, may be united with a panel of the auxiliary casing, such as panel 171 of Figure 21.

Now having described the manner in which the various dishes of Figure 21 may be formed from a flat blank of material, I will describe how the form may be used to produce a complete insulating casing, including the outer auxiliary casing after the dishes have been formed in the blank. The blank 153 of Figure 21 may thus be folded on the score lines 200, 201 and 202. This will produce a form of tube similar to that formed by the side walls of Figure 19. On continuing to fold the blank on score lines 203, 204, 205 and 206, panel 171 will cover dish 161, panel 172 will cover dish 162, panel 173 will cover dish 163 and panel 174 will cover dish 164. The unit may be secured in this position by applying the adhesively prepared tape 160 over the joint where the free edge of panel 174 meets the panel 171, as is clearly shown in Figure 23. The bottom end of the casing is closed by first bending panel 176 on the score line 210 to cover the dish 166. The dish so covered may then be turned on score line 209 when it will fit into wedge shaped space formed by the 45° bevels of the bottom panels of the four dishes making the sides of the casing. The bottom may be secured in this position by a strip of adhesive tape. The casing may then be filled with the material to be protected, for instance, a brick of ice-cream; after which the top panel may be closed in the same manner as the bottom. That is, panel 175 is folded on score line 208 to cover the dish 165. The covered dish is then folded over on score line 207 to close the opening at the top of the casing, as is clearly shown in the cut away portion of Figure 23. A tape 160 may be used to secure this top closure member in place.

It is here pointed out that just as the form which comprises the main casing and the auxiliary casing in an integral sheet, may be formed from a sheet of flat material with a minimum of waste, so may the various other forms of modified blanks which I have described be formed. In order to further illustrate this I have shown Figure 24 which illustrates how the form shown in Figure 13 may be cut from a strip of sheet material with substantially no waste. Thus in Figure 24 I have shown portions of blanks 210, 213 and 214; and entire blanks 211 and 212, each of which may be used for producing the dish-shaped forms of Figure 13 using the method which I have described from the enlarged fragmentary Figure 22. In Figure 24 it will be seen that there is substantially no waste in forming these blanks even with the wings for the top and bottom panels attached. The blank 212 shows the details of the cutting and scoring, which details are omitted from the other blanks both for simplicity and clarity. The blank 212 of Figure 24 is composed of the sections 221, 222, 223, 224, 225 and 226, which correspond respectively to the dishes 101, 102, 103, 104, 105 and 106 of Figure 13.

I have shown my invention in various modified forms. The particular forms shown are, however, by way of illustration only, as many changes may be made in my invention without departing from the scope and spirit of the appended claims. Now having described my invention in a manner that it may be clearly understood by one skilled in the art, I claim:

1. An integral blank made of foldable sheet material scored along certain lines and cut along certain other lines forming in connected series middle-wall portions with hingedly connected trapezoidal side-wall and end wall portions, flap extensions on the side wall and/or end wall portions comprising means for securing together adjacent ends of end walls and said side walls, the whole forming a dish-strip of rectangular dish members, each dish member comprising a middle portion and outwardly sloping side and end walls, said dish members being hingedly connected in series.

2. A strip of rectangular dish members, of sheet material, each dish member comprising a middle portion and outwardly sloping side walls and end walls, said dish members hingedly connected to each other in series at their side-wall edges; said strip having a closure sheet secured to the edges over the concavity side of said strip.

3. An air-space insulated section comprising a strip of connected dish members of sheet material, each dish member comprising a middle portion and outwardly sloping side walls and end walls, said dish members hingedly connected to each other in series at their side-wall edges; closure sheet covering its concave surface forming insulation air-cells.

4. An air-space insulated section comprising a strip of connected dish members of sheet material, each dish member comprising a middle portion and outwardly sloping side walls and end walls, said dish members hingedly connected to each other in series at their side-wall edges; said strip folded on its bend-lines and secured to form a tube-like section, closure walls covering its concave surfaces forming air-cell insulated walls, and closure means for the ends of said section.

5. An air-space insulated section comprising a strip of connected dish members of sheet material, each dish member comprising a middle portion and outwardly sloping side walls and end walls, said dish members hingedly connected to each other in series at their side-wall edges; said strip folded on its bend-lines and secured to form a tube-like section, closure walls covering its concave surfaces forming air-cell insulated walls and closure means for the ends of said section, said closure means comprising hingedly connected flaps extending from said closure walls.

6. A strip of connected rectangular dish members, of sheet material, each dish member comprising a middle portion and outwardly sloping side walls and end walls, said dish members hingedly connected to each other in series at their side-wall edges, said strip folded on its bend-lines and secured in tube-like section, having its concave surfaces facing outward, closure walls on said tube secured to the peripheral edges of said concave walls.

7. An air-space insulated section comprising a strip of connected dish members of sheet material, each dish member comprising a middle portion and outwardly sloping side walls and end walls, said dish members hingedly connected to each other in series at their side-wall edges, said strip folded on its bend lines and secured in tube-like section, having its concave surfaces facing inward, closure walls lining said tube secured to the peripheral edges of said concave walls.

8. An air-space insulated section comprising a strip of connected dish members of sheet material, each dish member comprising a middle portion and outwardly sloping side walls and end walls, said dish members hingedly connected to each other in series at their side-wall edges, closure sheet covering its concave surface forming insulation air-cells, and heat reflector surface within said air cells.

9. An air-space insulated section comprising a strip of connected dish members of sheet material, each dish member comprising a middle portion and outwardly sloping side walls and end walls, said dish members hingedly connected to each other in series at their side-wall edges, said strip folded on its bend-lines and secured to form a tube-like section, closure walls covering its concave surfaces forming air-cell insulated walls, and closure means for the ends of said section.

10. An air-space insulated section comprising a strip of connected dish members of sheet material, each dish member comprising a middle portion and outwardly sloping side walls and end walls, said dish members hingedly connected to each other in series at their side-wall edges, said strip folded on its bend-lines and secured to form a tube-like section, closure walls covering its concave surfaces forming air-cell insulated walls and closure means for the ends of said section, said closure means comprising hingedly connected flaps extending from said closure walls.

PHILIP ZALKIND.